United States Patent [19]

Holladay et al.

[11] Patent Number: 4,553,171
[45] Date of Patent: Nov. 12, 1985

[54] TILE ENCODING IN IMAGE PRINTING

[75] Inventors: Thomas M. Holladay, Webster, N.Y.; L. Bayles Holt, San Jose, Calif.

[73] Assignee: Xerox Corporation, Stamford, Conn.

[21] Appl. No.: 574,506

[22] Filed: Jan. 27, 1984

[51] Int. Cl.⁴ ............................................. H04N 1/00
[52] U.S. Cl. ..................................... 358/263; 358/260
[58] Field of Search ......................... 358/260, 262, 263

[56] References Cited

U.S. PATENT DOCUMENTS

| | | |
|---|---|---|
| 3,215,773 | 11/1965 | Chatten et al. |
| 3,582,905 | 6/1971 | Kraatz . |
| 3,980,809 | 9/1976 | Cook ................................... 358/263 |
| 3,992,572 | 11/1976 | Nakagome et al. ................. 358/260 |
| 4,013,828 | 3/1977 | Judice ................................. 358/133 |
| 4,281,312 | 7/1981 | Knudson ............................. 358/260 |
| 4,446,516 | 5/1984 | Nishimura .......................... 358/260 |
| 4,494,150 | 1/1985 | Brickman et al. .................. 358/263 |

OTHER PUBLICATIONS

"Block Character Coding"; F. Pratt, W. K., W. Chen and C. Reader; Proceedings SPIE; Aug. 1976, pp. 222-228.

Primary Examiner—Howard W. Britton
Assistant Examiner—John K. Peng
Attorney, Agent, or Firm—Ronald F. Chapuran

[57] ABSTRACT

A method for digitally printing a digital image by reference to a succession of code words representing blocks of pixels of the original image. The image is originally subdivided into uniform size blocks of pixels. Each of the blocks of pixels is given a unique identifier unless it is identical to any of the previously scanned blocks. Identical groups are given the same identifier. In printing the digital image, the identifiers are scanned in sequence and the corresponding pixel blocks are successively stored in buffer memories for modulating the printer.

7 Claims, 4 Drawing Figures

ORIGINAL IMAGE IN
64 8x8 BLOCKS

| IDENTIFIERS | BIT PATTERN OR TILE SET |
|---|---|
| 0 | 1 |
| 1 | 3 |
| 2 | 8 |
| 3 | 13 |
| 4 | 15 |
| 5 | 20 |
| 6 | 22 |
| 7 | 23 |
| 8 | 24 |
| 9 | 29 |
| 10 | 30 |
| 11 | 31 |
| 12 | 32 |
| 13 | 33 |
| 14 | 34 |
| 15 | 40 |
| 16 | 48 |
| 17 | 49 |
| 18 | 52 |

(8 x 8 BLOCKS OF PIXELS OF ORIGINAL IMAGE)

*FIG. 3*

TILE STREAM OR RECORD

| 0 | 0 | 1 | 1 | 0 | 1 | 1 | 2 | — 1 SCAN LINE |
|---|---|---|---|---|---|---|---|---|
| 0 | 1 | 2 | 2 | 3 | 3 | 4 | 4 | — 2 SCAN LINE |
| 2 | 3 | 4 | 5 | 5 | 6 | 7 | 8 | |
| 5 | 6 | 7 | 8 | 9 | 10 | 11 | 12 | |
| 13 | 14 | 14 | 14 | 13 | 12 | 12 | 10 | |
| 14 | 13 | 12 | 8 | 10 | 13 | 15 | 16 | |
| 17 | 17 | 17 | 18 | 18 | 18 | 17 | 16 | |
| 13 | 8 | 5 | 2 | 0 | 1 | 0 | 0 | — 8 SCAN LINE |

*FIG. 4*

TILE ENCODING IN IMAGE PRINTING

The present invention relates to block encoding and, in particular, to the application of block encoding in the printing of digital images.

In laser printing or scanning characters onto a CRT display, it is well known to modulate the scanner in response to a code word representing each character. Typically, a seven bit code word or other non-binary code word represents a character to be printed and a decoder responds to the code word to address a bit map in suitable memory to modulate the printer or scanner to provide a succession or zeros and ones to print the character image.

It is also known to store information necessary for displaying characters in various sizes and fonts, although the size of the storage often becomes excessive. To reduce the amount of data required for a character output, a technique known as "run length coding" was developed to compress the data by storing the length data of the black and white areas of the characters as shown in U.S. Pat. No. 3,582,905. These systems, however, only apply to predetermined characters such as the scanning of alphanumeric characters. It would be desirable, therefore, to extend the concept of character recognition and bit mapping to the printing of stored digital images.

It is also known in the prior art to be able to reproduce and transmit high detail pictoral data such as in facsimile systems. Such systems generall require either a very wide bandwidth or a relatively long time to transmit or recreate the image. It is also known, as taught in U.S. Pat. No. 3,215,773, that there is a high degree of redundancy present in most images and that savings can be achieved by taking advantage of this redundancy. In particular, U.S. Pat. No. 3,215,773 teaches the scanning of an image in contiguous small areas and representing the signal derived from each area by a code signal having a complexity determined by the detail present in that area.

It is also known as described in U.S. Pat. No. 4,013,828 to scan and process an image in picture element groups of predetermined size. As each picture element group is scanned, the pattern represented by the corresponding dithered image bits is compared to a dictonary of patterns stored in a first memory. If the pattern is not among those in the memory, it is assigned an associated code word and entered into the memory. In addition, both the pattern and its code word are transmitted to the remote location where they are stored in a second memory, and individual cells of a cell group corresponding to the scan picture elements are energized in accordance with the pattern. If, on the other hand, a scan pattern is the same as one already stored in the first memory, only the code word associated with that pattern is transmitted to the remote location. The code word is used at the remote location to retrieve the associated pattern from the second memory when it is displayed at the corresponding cell group of the display panel.

A difficulty with these prior art systems, however, is that they are not adaptable to a variety of digital images having various degrees of redundancy and capable of being represented by variable length code words. It is, therefore, an object of the present invention to extend the block encoding concept of a one byte or less code word to a variable number of bits to represent by identifiers or code words various portions of a digital image. It is another object of the present invention to be able to print an image in the same manner as printing a character without any major changes in the printing logic. A still further object of the present invention is to be able to compress data on a storage element such as a disk in order to run a display at a higher rate. Further advantages of the present invention will become apparent as the following description proceeds, and the features characterizing the invention will be pointed out with particulrity in the claims annexed to and forming a part of this specification.

Briefly, the present invention is a method for digitally printing a digital image by reference to a succession of code words representing blocks of pixels of the original image. The image is originally subdivided into uniform size blocks of pixels. Each of the blocks of pixels is given a unique identifier unless it is identical to any of the previously scanned blocks. Identical groups are given the same identifier. In printing the digital image, the identifiers are scanned in sequence and the corresponding pixel blocks are successively stored in buffer memories for modulating the printer.

For a better understanding of the present invention, reference may be had to the accompanying drawings wherein the same reference numerals have been applied to like parts and wherein:

FIG. 3 is an illustration of unique identifiers or character numbers and associated bit patterns or tile sets; and FIG. 4 is an illustration of a tile stream or scan line record in accordance with the present invention for displaying a digital image.

Figures 1, 2:
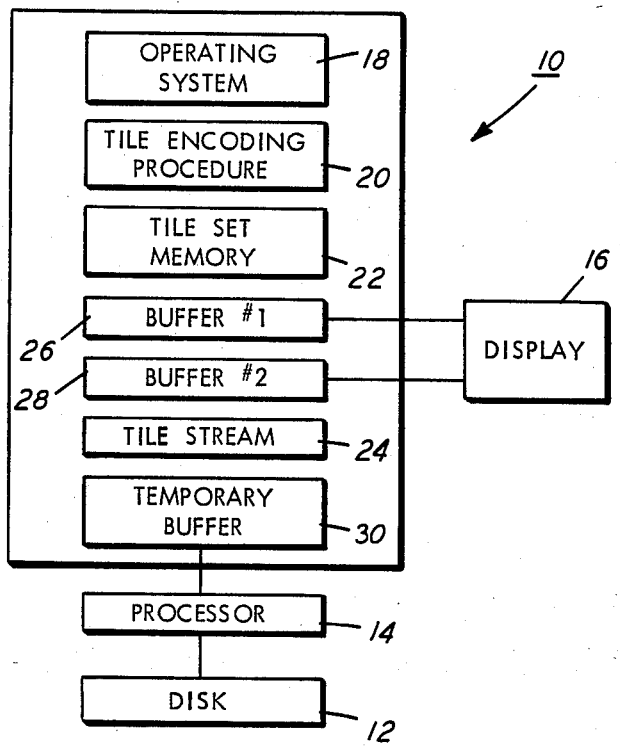
FIG. 1 is a general block diagram of the system incorporating the present invention.
FIG. 2 is an illustrative digital image broken down into uniform sub-blocks.

With reference to FIG. 1, there is generally shown a general block diagram of a system incorporating the present invention. In particular, there is shown a memory generally shown at 10, a disc 12 storing a digital image to be displayed, a processor 14 communicating with the memory 10 and the disc 12, and a display 16. The memory 10 is further broken down into various locations including the operating system 18, the tile encoding procedure 20, a tile set 22, a tile stream 24 and output buffers 26 and 28 communicating with the display 16.

FIG. 2 illustrates a typical digital image stored on disc 12. In accordance with the present invention, the digital image is segregated into tiles or blocks, each block containing N by M bits or pixels. For purposes of illustration, it will be assumed that there are 64 blocks and that each of the tiles or blocks 1 through 64 shown in FIG. 2 comprises an 8×8 matrix of bits or pixels. It should be noted, however, that any arbitrary matrix size N by M is suitable, for example 16×16 bit blocks, 8×16, 6×8, or 13×9 bit blocks. Assuming there is a digital image stored on disc 12 and it is desired to segregate the image into 8×8 tiles or blocks of pixels, the first step is to compare each 8×8 bit block with all previous blocks or tiles to establish unique characters or identifiers related to the blocks.

With reference to FIG. 2, the first 8×8 bit block, number 1, is automatically assigned an identifier 0, since there are no 8×8 bit blocks preceding block number 1. Thus, the unique identifier 0 is identified with bit block number 1. It should be noted, however, that the identifier zero is often reserved for a bit block of all zeroes. Next, bit block 2 is compared to bit block 1 in the processor 14. Assuming that bit block 2 is identical to bit block 1, that is the bit pattern of block 1 is identical to the pit pattern of block 2, no unique identifier is associated with bit block 2. Bit block 2 is therefore represented by the identified 0. Next, bit block 3 is compared to bit block 1 and bit block 2. In this case, assuming that bit block 3 is different from bit blocks 1 and 2, a unique identifier number 1 is associated with bit block 3.

In this manner, a scratch pad memory of identifiers and related first occurrences of a particular bit pattern or tile set is established. With reference to FIG. 3, there is shown a table of sequential identifiers and also a table or tile set of related 8×8 blocks of pixels. The identifier 0 corresponds to tile set 1 and the idetifier number 1 corresponds with tile set 3 since tile set 2 is identical to tile set 1.

With continued reference to FIG. 3, the next unique identifier number 2 is associated with tile set or bit block 8. In other words, in the hypothetical example, tile set 8 is different from any of the previous 7 tile sets. This also implies that the comparison of tile sets 4, 5, 6 and 7 has determined that tile sets 4, 5, 6 and 7 are identical to either tile set 1 or tile set 3. In a similar manner, each of the 64 tile sets of FIG. 2 is successively compared with all previous tile sets. FIG. 3 illustrates the comparison of each bit pattern with all previous bit patterns. That is, tile set 13 is different from any of the previous 12 tile sets and is given the unique identifier 3, tile set 15 is different from the previous 14 tile sets and is given the identifier 4, down to tile set 52 which is different from all previous 51 tile sets and is given the unique identifier 18.

No further unique identifiers being shown after identified 18 means that tile sets 53 through 64 are identical to one of the tile sets 1 through 52. Each of the tile sets corresponding to a unique identifier is then stored in a separate memory location, tile set memory 22. It should be noted that in the example given, there are 18 unique identifiers. In a typical digital image, however, the number of unique identifiers is often found to be greater than 256, thus necessitating an identifier code greater than 8 bits or 1 byte.

One further memory table is established, the tile stream 24 shown in FIG. 1. The tile stream 24 is a record of the identifier corresponding to each of the 8×8 bit blocks of the image in FIG. 2. Thus, the unique identifier for block 1 is 0 as illustrated in FIG. 3. In the tile stream, a zero (0) will be inserted in the location corresponding to block 2 to signify that the tile set corresponding to block 2 is in fact the same tile set as for block 1. That is, the tile stream is a stream of identifiers to identify the tile set or bit pattern relating to each of the 64 blocks.

Thus, the first two identifiers of the tile stream will be zeros. Since the block number 3 is different from blocks 1 and 2, and therefore has a unique identifier 1, a one (1) will be inserted in sequence following the two zeros in the tile stream. Assuming that block 4 is identical to block 3, block 4 will receive the same identifier as block 3, i.e. identifier number 1. In a similar manner, assuming that block 5 is identical to block 1 and blocks 6 and 7 are identical to block 3, a first scan line of the tile stream will be (001100112) as illustrated in FIG. 4.

Block 8, as illustrated in FIG. 3, has the unique identifier 2 and thus the 2 is inserted in sequence in the tile stream to correspond to the last 8×8 bit block or block 8 in the first line of the image of FIG. 2. Therefore, for each of the 64 blocks of FIG. 2, a corresponding identifier is provided in the tile stream. The identifer in the sequence of tile streams is either unique representing that the block is not identical to any of the other previous blocks or is a previous identifier representing that the particular block is identical to another previous.

It should be noted that for each block of FIG. 2 there is a corresponding identifier in FIG. 4. The first identifier in the second scan line is a 0 indicating that block 9 is identical to block 1. In a similar manner, block 10 is identical to block 3, and blocks 11 and 12 are identical to block 8. Block 13 is different from any previous block and therefore receives the unique identifier 3. Block 14 is identical to block 13 and therefore also receives identifier 3 and blocks 15 and 16 are different from all previous blocks and identical, and therefore receive the identifier 4.

There are 18 different tile sets. The remaining tile sets are identical to at least one of the other tile sets. These 18 tile sets are stored in the tile set memory location 22. The tile stream is stored in the tile stream location 24. It should be noted that in all digital images there are generally found to be redundnacies. By taking advantage of these redundancies, it is possible to by only storing a tile set and a tile stream to greatly decrease the amount of storage location required by relating each segregated block of the image to an identifier, In general, most images probably cannot be identifed with less than 256 identifiers but clearly a two byte identifer would be sufficient. In accordance with the present invention, by listing the number of unique identifiers required, it is possible to determine the number of bits necessary to completely relate identifiers to each bit block of the image.

With the tile sets stored in location 22 and the tile stream in location 24, the system is ready to display or print the image. Before printing, however, it is necessary to establish a buffer size to accomodate the bit patterns, usually either 8 or 16 bits. The height of the bit pattern is the number of bits in the vertical direction, in the illustrated example, 8 bits.

The first step in printing is threfore to read the first tile stream or record that has been stored on disc 12 in a scratch pad area into a temporary buffer as illustrated as temporary buffer 30. This is the first scan line of the image, that is (00110112). For each identifier in the temporary buffer 30, the next step is to load the corresponding tile set into the first buffer. Preferably, the first buffer is of sufficient size to hold the first scan line of the image. That is, the first scan line will be the tile sets corresponding to image blocks 1 through 8. Thus, in the particular example given, buffer 26 as well as buffer number 28 will be of sufcent size to accomodate eight 8×8 pixel blocks.

After the first record has been loaded into buffer 26, the first buffer contents modulate the printer or display to display the first scan line of the image on the display 16. While printing out the contents of the buffer 26, the second record or scan line (01223344), as illustrated in FIG. 4, is read from the disc into the temporary buffer 30. The tile sets corresponding to the second scan line are loaded into buffer 28. When buffer 26 has been read out to modulate the display, the contents of buffer 28 began modulating the display. In this manner, the entire image is displayed by sequentially displaying the tile sets corresponding to each of the scan lines illustrated in FIG. 4, until the tile sets corresponding to the eighth scan line (13, 8, 5, 2, 0, 1, 0, 0) has been displayed.

The addressing of the tile sets is straightforward. If the beginning address of block 1 of the tile set is 0000 is binary, then the beginning address of block 3 corresponding to identifier 1 is 1000 is binary or 8, since each of the tile sets is an 8×8 block. The next block in the tile set is block 8 corresponding to identifier 2 and therefore is located at beginning address 10000 is binary or 16. Therefore, to find the beginning address of a particular tile set it is only necessary to multiply the identifier corresponding to that tile set by 8 to determine the beginning address of the particular block. It should be noted that there are alternate means to address a particular tile set, for example, a pointer to the position in the word is kept. The Appendix is a preferred embodiment of the method of block encoding for displaying digital images. It should be noted that the results of this process is to create a compressed image on a disk and to allow the display to be operated at a higher bandwidth than the disk.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

APPENDIX A

```
***********************************************00
**********START OF CONTROL LOGIC*****************00
***********************************************00
TRDB     THI    R0,R0RDB              IS RD BIT SET
         BTCS   X'F',RDTXT            YES-READ TEXT
TZB      THI    R0,R0ZB               NO;TEST ZEROBIT
         BTC    X'F',CKWB             YES;CHECK WHICH BUFFER TO ZERO
TZBA     OHI    R0,R0RDB+R0ZB           TXT EXIST ALREADY;RESET TO RD&ZERO MODE
         B      TSTBB                 BYPASS FRMT PART DONE PREVIOUSLY
RDTXT    EQU.   *
         THI    R0,R0PRB              PRINT ROTATED ?
         BZ     RDTXTNR               NOT ROTATED
* ITS A ROTATED CASE SO CK IF RD IS REQUIRED ONLY IF ACTOPLI=0
         L      R13,ACTOPLI           IF=0 DO A RD.
         BNZ    SETNXTR
*MUST DO A RD OF NXT RCD BEFORE SETTING POINTERS.
         SVC    1,ARDTXT
*        SVC    2,TIME                PUT IN TIME ALSO
         LH     R15,ARDTXT+SVC1.STA   GET ARDTXT+SVC1.STA-USTED CASCADED SIG
         BZS    INCRAA                STATUS=0=OK OTHERWISE ERROR
EOFFND   L      R15,ARDTXT+SVC1.FC    GET ARDTXT+SVC1.FC &STATUS
         NHI    R15,X'FE00'           PUT STATUS WRD IN R0
         OR     R0,R15
         OHI    R0,R0EOFB             SET EOF BIT &ZERO BIT
         B      SVCC                  FINISH EVERY THING IS DONE.
INCRAA   EQU    *                     SET UP INITIAL POINTERS.
         L      R13,ATOPL             TOP LEFT CORNER OF TXT.
         ST     R13,ACTOPLI
         L      R14,ARTXTA
         ST     R14,ACERTXT
         L      R15,ARDTXT+SVC1.RAD   RANDOM ADDRESSS
         AIS    R15,1                 NXT ONE
         ST     R15,ARDTXT+SVC1.RAD   NXT ONE TO READ
         C      R15,LNCNTR            IS IT PAST THE END?
         BP     EOFFND                EOF FOUND QUIT.
         BS     *+6                   SKIP NXT INSTRUCTION.
SETNXTR  L      R14,ACERTXT
*SET FR15 & FR6 NOW.
         L      R15,0(R14)     GET 1ST HALF WD NOTE NOT L L
         SRA    R15,20                ONLY 1ST 12 BITS=-=ON LI.
         AR     R15,R13
         ST     R15,FR15 SET ST VALUE.
         L      R15,0(R14)            GET LAST 20BITS ONLY
         NI     R15,Y'000FFFFF'       =-CB ON APAGE
```

```
              ST      R15,FR6       SET # OF VALUES AHEAD NOTE LBL HERE.
              AIS     R14,4                      PT TO NXT WORD.
              ST      R14,ACERTXT
NXTX          AIS     R13,0         SET=1 OR, 2 IF FONT>256.INC TO NXT X POS.
              CL      R13,ATOPR                  PAST END?
              BCS     *+4
*NXT ACCESS MUST DO A RD SET=0
              LIS     R13,0
              ST      R13,ACTOPLI
              B       TSTBB         HAVE ALL THE DATA NEEDED.
*
* PUT IN CALCULATIONS FOR WHICH ROW OF ROTATED PAGE..
RDTXTNR       SVC     1,ARDTXT      RD,WAIT,SEQ,BIN FROM LU=1
              L       R15,ARDTXT+SVC1.RAD RANDOM ADDRESSS
              AIS     R15,1                      NXT ONE
              ST      R15,ARDTXT+SVC1.RAD NXT ONE TO READ
              C       R15,LNEND                  IS IT PAST THE END?
              BPS     SETLAST
              LB      R15,ARDTXT+SVC1.STA      GET ARDTXT+SVC1.STA-USTED CASCADED SIC
              BZ      INCRA                    STATUS=0=OK OTHERWISE ERROR
SETLAST       L       R15,ARDTXT+SVC1.FC       GET ARDTXT+SVC1.FC &STATUS
              NHI     R15,X'FF00'              PUT STATUS WRD IN R0
              OR      R0,R15
              OHI     R0,R0EOFB+R0ZB           SET EOF BIT &ZERO BIT
              NHI     R0,-R0RDB-1              ZERO RD BIT
*MAY BE ABLE TO CARRY THESE #'S IN REG &CHECK LATER
              L       R15,NLIPG                MUST ZERO REST OF PAGE
              ST      R15,NLIZ                 SET #LINES TO ZERO
              B       CKWB                     MUST ZERO REST OF LINE
INCRA         EQU     *
*PUT IN COMMON STUFF (R13)=.EAD+1,(R15)=.SAD
              L       R15,ARDTXT+SVC1.SAD      YES-DO IT A(ARDTXT+SVC1.SADART)
              L       R13,ARDTXT+SVC1.LXF      LENGTH OF TRANSFER
              BNP     CKWB                     SVC1.LXF=0,<0 ZERO THIS ONE
              LR      R14,R13
              AR      R13,R15                  =.EAD+1
CKPE          THI     R0,R0PEB                 PRINT EVERYTHIN?
              BP      NBLANK                   PRINT EVERYTHING.
*FIND 1ST CR& THEN BLANK SUPPRESS FROM END.
              ST      R0,FSTRDOK+48
              ST      R1,FSTRDOK+52
              ST      R2,FSTRDOK+56            SAVE THESE REGISTERS.
              LIS     R2,0                     NO TRANSLATION.
              LIS     R0,X'0D'                 CR I'M LOOKING FOR.
              MVTU    R14,0(R15),R14,0(R15)    LOOK FOR CR.
              LR      R13,R1                   =.EAD+1=POS OF CR
              L       R0,FSTRDOK+48
              L       R1,FSTRDOK+52
              L       R2,FSTRDOK+56
*
              THI     R13,1                    IS SVC1.EAD ODD
              BZS     EVENBC
              LB      R12,-1(R13)
              XHI     R12,ABLK                 IS IT ACII BLK
              BNZS    NBLANK                   SET BUFFER PARAMETERS CAN NOT SUPPRES
              SIS     R13,1                    YES IT'S ODD
EVENBC        CLR     R15,R13
              BNC     CKWB                     HAD ONLY 1 CHAR=X'20'.
              LHL     R12,-2(R13)              LD HALFWRD FROM RD BUFFER
              CLHI    R12,ADBLK                IS THIS HALFWRD BLK
              BNES    NBLANK                   .NE. X2020
              SIS     R13,2                    YES DEC HALFWRD COUNT=SVC1.LXF
              BS      EVENBC                   TRY NXT HALFWRD
NBLANK        EQU     *
*SAVE FORMATTING INFO & CK IF @ END
              ST      R13,FR15
              SR      R15,R13                  =-# TO DO
              ST      R15,FR6
```

```
* CHECK IF FORMATTING REQUIRED
*8
TFMB     THI    R0,R0DFB              FORMAT BIT?
         BZ     TSTBB                 DON'T FORMAT
         L      R15,ARDTXT+SVC1.SAD
* NOTE 1ST BYTE IS ASCII FOR NUMBER,1.E. X'30'=0;X'37'=7.
* FORMAT AS:
*1ST BYTE    RD Z  NLIZ
*    1        0 0  =NLIPG
* 0<=*<=9    0 1  VALUE
* OTHERWISE PRINT AS IS
*
         LB     R14,0(R15)            GET FIRST BYTE
         CLHI   R14,C'0'              PRINT EVERYTHING WHETHER * OR NOT
         BTC    8,TSTBB
         CLHI   R14,X'3A'             <9
         BFC    8,TSTBB                DO NOT FORMAT;1ST BYTE>9
         NHI    R14,15                1ST BYTE IS A * STRIP TO NIBLE
         SIS    R14,1                 SHIFT * ALL DOWN ONE
         BNZS   NZLA                  NOT A 1 WHICH IS SPECIAL CASE
* 1ST BYTE WAS * 1
         NHI    R0,-R0RDB-R0ZB-1           RDZ=BITS =00
         L      R14,NLIPG             THIS ONES GOES TO TOP NXT PG
         BS     NZL
NZLA     AIS    R14,1                 RET TO ORIG VALUE-CANNOT BE 1 HERE
         BTCS   3,*+4                 0 IS SPECIAL CASE
         AIS    R14,1                 CHANGE ONLY Z 0 TO 1
         NHI    R0,-R0RDB-1              SET RD BIT=0
NZL      ST     R14,NLIZ              CONTAINS * LINES TO ZERO AFTER THIS LINE
         LHI    R14,C' '
         STB    R14,0(R15)            PUT BLK SPACE BACK AS 1ST BYTE
* PRINT THIS LINE AND ZERO AFTERWARDS
* OR ZERO 1ST THEN PRINT IF Z BIT=0
         THI    R0,R0RDB+R0ZB
         BZ     CKWB                  IMPLIES THIS LINE AT TOP NXT PG
* FORMAT THIS LINE THEN DO ZEROING
*8
TSTBB    THI    R0,R0BBB              SEE WHICH BUFFER TO FRMT INTO
         BNP    FMB0                  FORMAT BUF 0
* SET UP REG TO FORMAT CORRECTED B FORMAT BUFFER 1
* SETUP FOR BUFFER 1
*
FMB1     L      R4,SVCB1+SVC1.SAD
         L      R13,SVCB1+PZHW
         BAL    R15,FORMAT            FORMAT A LINE
         ST     R14,SVCB1+PZHW
*88
CKWB1    SVC    1,SVCB1
         LHL    R7,SVCB1+SVC1.STA     STATUS OF RET
* CHECK IF ERRORS
         BZ     FLIPBB
ERR07    LR     R0,R7                 COMMON ERR PT. FOR SVC1 RETS
         B      SVCC                  SOMETHIN WRONG WITH DEVICE.ONLY STATUS
*
FMB0     L      R4,SVCB0+SVC1.SAD
         L      R13,SVCB0+PZHW
         BAL    R15,FORMAT
         ST     R14,SVCB0+PZHW        STORE ZZEROED NXT
*88
CKWB0    SVC    1,SVCB0
*CK IF SVC HAD ERRORS
         LHL    R7,SVCB0+SVC1.STA     STATUS OF RET
         BNZS   ERR07
*8
FLIPBB   XHI    R0,R0BBB              FLIP WHICH BUFFER CANBE ZEROED NXT
TWAIT    SVC    2,WAIT1SEC            WAIT8TRY AGAIN
* MAY WANT THIS VALUE IN A REG
```

```
*#
WTONXT   L     R15,NLIPC          DEC #LI/PG BY 1
         SIS   R15,1
         ST    R15,NLIPC
         BPS   PNLIPG             WHAT IS EXPECTED MOST OF THE TIME.
*
         BZS   CKEQZ              EQUAL ZERO
         BM    CKLTZ              <0
*NLIPC IS POSITIVE - NLIZ MAY BE PUT IN REG
PNLIPG   L     R15,NLIZ           CURRENT
INIT     BP    CKWB               MORE BUFFERS TO ZERO
         THI   R0,R0RDB+R0ZB
         BZ    TZBA
         OHI   R0,R0RDB+R0ZB
         B     TRDB
*
CKEQZ    LI    R8,DEFPR           IF OUT=VR: DO FORM FEED
CFD      CLI   R8,CFD         STORED OUT=HERE
         BNES  *+10               SKIP NXT 2 INSTRUCTION
         SVC   1,SVCFF            DO A FORM FEED CMD..SET BEFORE
         B     WTONXT
CKEQZA   THI   R0,R0BBB           WHICH BUFFER TO ZERO
         BPS   CB1
         L     R8,SVCB0+PBEND     PARTIAL BUFFER END ADDR
         ST    R8,SVCB0+SVC1.EAD
         B     Z0                 ZERO BUFFER 0
CB1      L     R8,SVCB1+PBEND
         ST    R8,SVCB1+SVC1.EAD
         B     Z1                 ZERO B 1
*
CKLTZ    THI   R0,R0EOFB          IS IT EOF
         BNPS  NEOF
*        END OF FILE OR OTHER ERROR - TERMINATE
SVCC     SVC   2,CONVERT
SVCE     SVC   2,ERMST
         SVC   1,SVCFF            DO A FORM FEED
SVCEND   SVC   3,0
* NORMAL TERMINATION - THINGS WERE OK SEE END STATUS
*
NEOF     THI   R0,R0BBB           WHICH BUFFER
         BPS   RSE0               ITS BUFFER 1 NOW NEED BUF 0
         L     R7,B1END           END ADDRESS RESTORE FROM PARTIAL BUF
         ST    R7,SVCB1+SVC1.EAD     ITS BUFFER 0 NOW NEED BUF 1
         BS    NEOFA
RSE0     L     R7,B0END
         ST    R7,SVCB0+SVC1.EAD
NEOFA    L     R11,ONLIPC         ORIG # OF LI/PG INPUT
         ST    R11,NLIPC          RESET
         L     R15,TBNUMB         RESET # OF LI TO # TOP BLKS OF BUF
         ST    R15,NLIZ           1 BUFFER HEADER NORMALLY
*CAN PUT ON A HEADER .
         B     CKSH               SEE IF A HEADER OR NXT LI
**ZERO PART OF THE CONTROL-CANNOT USE REGS 0-3
**#
CKWB     THI   R0,R0BBB           WHICH BUFFER TO ZERO
         BZ    Z0                 ZERO BUFFER 0
Z1       L     R11,SVCB1+SVC1.SAD       ZERO BUFFER 1
         CL    R11,SVCB1+PZHW           WAS THIS ZEROED BEFORE
         BES   ZEROP              ZEROED PREVIOUSLY
         ST    R11,SVCB1+PZHW           SAVE PREVIOUS ZEROED BUFFER POS
*ZC = COMMON ZEROING POINT.
ZC       LIS   R10,0              R10 SETS BACKGND BITS
         S     R10,NBPB           -# BYTES/BUFFER
         SR    R11,R10            ST AD+NBPB
* R9=BACKGND BITS;R11=ST ADDR;R10=NBPB;ZERO FROM END TO ST
ZERO     STME  R0,0(R11,R10)      FL REG HAVE 32 BYTES OF BKGND..
         AHI   R10,32             # OF VALUES @ A TIME
```

```
          BMS    ZERO                 NOT THRU YET
ZEROP     LCS    R9,1                 THRU WITH ALL WRDS R9=-1
          AM     R9,NLIZ              NLIZ=NLIZ-1
          THI    R0,R0BBB             WHICH BUFFER
          BZ     CKWB0                OUTPT THIS ZEROED BUFFER
          B      CKWB1
*
Z0        L      R11,SVCB0+SVC1.SAD         GET ST ADDR
          CL     R11,SVCB0+PZHW       WAS THIS ZEROED BEFORE
          BES    ZEROP
          ST     R11,SVCB0+PZHW
          B      ZC                   BRANCH TO COMMON ZEROING PT
*
**********************************************@@
**********END OF CONTROL LOGIC****************@@
**********************************************@@
*
          ALIGN  4
ARDTXT    DCY    4C010000             RANDOMREAD ASCII WAIT NOT IMAGE MODE
          DS     SVC1.                SPACE=SVC1X TOTAL
SVCB0     DCY    31020000             WRITE BIN I/O PROCEED IMAGE MODE LU=2
          DS     SVCB-4
SVCB1     DCY    31020000             WRITE BIN I/O PROCEED IMAGE MODE LU=2
          DS     SVCB-4
*==========================================
*================START OF FORMAT===========
*==========================================
* ON ENTRY
* R4 CONTAINS BUFFER START POSITION ON ENTRY
* R13 CONTAINS PREVIOUS ZEROED HALFWRD POS ON THIS LINE
* FORMATS VARIABLE WIDTH CHAR ASSUMES FOLLOWING 8 AT LEAST 1 CHAR
* FOLLOWING ARE ASSUMED ALWAYS THER -
* R0 = STATUS WORD
* R1 = MAXWIDTH IN BITS ( ) OF 1 LINE
* R2= NBYX = # OF BYTES ON 1 LINE
* R3 = NHGT = - HEIGHT OF CHAR OR BUFFER (Y-DIM) *2
* R4 = STXHWPOS ON TOP LINE B1 OR B0 OF ST
* R15  RETURN ADDRESSES
*
*
* ON RETURNS:
* R14 = RETURNS LAST HALFWORD FORMATTED + 1 OR ZERO
* FROM THIS VALUE AND ABOVE
* PZHW IN THIS REG RETURNED TO MAIN
*
*
* R15 = BAL. RET ADDR; ASCII CH ST POS + # OF BYTES TO DO
* R14 = TOTWIDTH=0 AT ST; CURRENT LINE WIDTH
* R13 = NXTBIT= 0 AT ST INDEX TO WHERE NXT BIT CAN BE PUT
* R12 = LB = WIDTH OF CHAR AT ST; WIDTH INDEX OF CHAR
* R11 = CURRENT X HWPOS ON SUBSEQUENT LINE
* R10 = CURRENT COUNTER FOR HGT OF CHAR
* R9 = LD AND ST REGS = TEMP REG
* R8 = LD 8 ST REGS = TEMP REG
* R7 = TEMP REG IN AWLE 16
* R6 = CURRENT RDBUF CHARACTER POINTER (NEG NO)
* R5 = FONT CHAR IN ASCII OR EBCDIC OR A( CHAR IN TABLE)
*
          ALIGN  4
B0END     DCY    0                    SVCB0+SVC1.EAD
B1END     DCY    0                    SVCB1+SVC1.EAD  USED IN PARTIAL BUFFER PART
RR15      DCY    0                    RETURN ADDRESS
BSTPOS    DCY    0                    DYNAMICALLY SET=ST ADDR
PZHWF     DCY    0                    PREVIOUSLY ZEROED VALUE
FR15      DCY    0 DYNAMIC .SAD+N FOR FORMATTING
FR6       DCY    0                    DYNAMIC =-N FOR FORMATTING
LNCNTR    DCY    0                    COUNTS PAGES OF ROTATED IMAGES.
```

```
*
FORMAT  EQU   *
        ST    R4,BSTPOS
        ST    R15,RR15              CAN NOW USE RM5 FOR READ WITHIN HWD DIST
        ST    R13,PZHWF
        L     R14,OSNUMB            * BITS TO OFFSET LEFT MARGIN;* TOTWID AT ST
        LR    R12,R14
        SRLS  R12,4                 NOW HAVE * BYTES  FROM LEFT MARGIN
        SLLS  R12,1                 MAKE A WD ADDRESS BUT IN BYTES
        AR    R4,R12                (R4)=ST ADDR +(OSNUMB/16)
        L     R15,FR15
        L     R6,FR6
        LIS   R13,X'F'              NXTBIT=X'F' AT ST
        NR    R13,R14               LAST 4 BITS INTO NXT BIT;* 0-15
* MUST ZERO AHEAD OF OFF-SET POSITION IF NOT HLFWD BDRY
        BZS   GETCH                 ON EVEN HLFWD BDRY.
HWS     SH    R6,CHD3+2             SET DYNAMICALLY TO 1 OF *ON A LI
ALLZER  LHI   R5,X'20'              FORMAT BLANK=X'20' &WIDTH=0
        LIS   R12,0                 THE WIDTH=0
        BS    NEOS                  Not Even Off-Set
* R6 PRODUCES PHANTOM CH AT 1ST.
************KEEP INST TOGETHER
********************************************00
* LB INSTRUCTION MAY BE SET DYNAMICALLY TO LHL
* FOR FONTS WITH A LARGE * OF CHARACTERS
* I.E. LB=OP CODE D3 ; LHL = 73
GETCH   LB    R5,0(R15,R6)  (R6)=-*CHARS TO DO,R15=A(RD)+*CH,R6=-*CH
* DYNAMICALLY SET = BSAT A + * OF CHARS TO DO SEE ABOVE
WIDTH   L     R12,AWIDTH            R12=A(WIDTH
NOOP4200 EQU  X'4200'
WIDP4   LB    R12,0(R12,R5)         R5=ASCII CHAR
* NEXT 2 INSTRUCTIONS USEFUL ONLY IF ZERO WIDTH SHOW UP FREQUENTLY
*       AIS   R12,0                 CC CK ON R12 VALUE
*       BZ    CHD3                  (R6)=-*OF ASCII CHAR TO DO
************KEEP INSTRUCTIONS TOGETHER..
********************************************00
        AR    R14,R12               R12=WIDHT AT 1ST LB INDEX AFTER R14=TOTWID
        CLR   R1,R14                WHEN MAXWID(R1)<TOTWID(R14)
        BTC   8,ZER                 LOOK ONLY AT CARRY BIT
NEOS    SLLS  R5,0                  DUMMY INST USED IF TILES USED
NEOSA   LHL   R5,ACH(R5,R5)         (R5,R5)=A(OF ST OF FONT CHAR IN ABITS.)
        AR    R12,R13               LB=NXTBIT+WIDTH R13=NXTBA
RLB     LR    R11,R4                R4=ST X HALFWRD R11=CUR Y PT
        SR    R5,R3                 (R5) ST ADD +BUFFER HGTS
        LR    R10,R3                R10=CURRENT CH HEIGHT (NEG *)
        SHI   R12,16                LB=R12 WIDTH CNTR
        AIS   R13,0                 CC CK ON NXTBIT
        BZ    AWE16                 ITS A HALFWRD BOUNDARY
        AIS   R12,0                 CC CK ON LB
        BNP   AWLE16
WGT16   LHL   R9,0(R5,R10)          HALFWRD(ST AD+*LI,-LI)
        RRL   R9,0(R13)             NXTBIT=AMOUNT TO SHIFT
        LHL   R8,0(R11)             GET WHATS THER -0 IN HIGH BYTE
        OR    R9,R8                 PUT TOGETHER
*
        STH   R9,0(R11)             MUST STORE BY HALFWRD MAY NOT BE FULLWRD
        SRL   R9,16                 BOUNDARY
        STH   R9,2(R11)
        AR    R11,R2                CURRENT XPOS=OLD XPOS+*BYTES ON LINE
*
        AIS   R10,2                 GET NEXT HALFWORD
        BM    WGT16                 MORE TO DO
*
        AIS   R4,2                  NXT HALFWRD IN LINE
        CLR   R12,R13
        BTC   8,CHD1                (R12)=LB(NXTBIT=(R13)
        BTC   3,RLB
        B     CHD3                  LB=NXTBIT
```

```
*
DIFF     EQU     WLE16-WE16              THIS DIFF +WE16=A(WLE16)
AWLE16   LHI     R7,DIFF
WLE16    LHL     R9,0(R5,R10)            ST ADD+HGT,-HGT)
         RRL     R9,0(R13)               ---R13=NXTBIT
         LHL     R8,0(R11)               R11=CUR X POS ON SUBSEQ LINE
         OR      R9,R8
         STH     R9,0(R11)
         BS      NXTY                    GET NXT Y VALUE
*
AWE16    LIS     R7,0                    INDEX TO GET WE16
WE16     LHL     R9,0(R5,R10)            GET 1ST HALFWRD-ON 16 BIT BOUND
         STH     R9,0(R11)
NXTY     AR      R11,R2                  GO TO NXT LINE
         AIS     R10,2                   ARE THERE MORE TO DO
         BM      WE16(R7)                R7=0 IF WE16 OR GO TO WLE16
*
WCK      AIS     R12,0                   CC CK ON LB
         BMS     CHD0
         AIS     R4,2                    ADVANCE TO NXT HALFWRDS
         AIS     R12,0                   CC CK ON LB
         BZS     CHD1
         B       RLB
CHD0     AHI     R12,16                  LB=LB+16
CHD1     LR      R13,R12                 ST ENDING SHIFT PARAM IN NXTBIT
* IS THERE ANOTHER CHAR TO DO
*
* WILL NEED AIS R6,2 IF HALFWRDS
*
CHD3     AHI     R6,17                   R6=-*FORMATTABLE CHAR
         BNZ     GETCH                   MORE TO DO
* ZERO TO WHERE WE WERE PREVIOUSLY ON THIS LINE
ZER      AIS     R13,0                   CC CK ON NXTBIT=R13
         BZS     *+4                     SKIP NXT INSTR ON HALFWRD BOUND
         AIS     R4,2                    R14=CURRENT X ADDR TO STORE NXT HALFWRD
         LR      R14,R4                  START ZEROING FROM HERE SAVE R14 AS ZERO PT
* IF WN SET - CHANGE TO LCS R9,1; SEE ZC ALSO
BKGDV    EQU     *
         STE     R14,DUMMY               TRANS TO R9 FOR BKGND.
         L       R9,DUMMY                PUT IT IN CORRECT REGISTER.
         L       R7,BSTPOS
         AR      R7,R2                   R7=LAST FORMATTABLE HALFWRD +1
* IS THER ANYTHING ON THIS LINE WHICH I CAN ZERO
         CLR     R4,R7                   (R4) WHER I WANT TO ST R7 LAST POS+1
         BTCS    8,ZER1                  CAN ZERO
         BS      RET                     CANNOT ZERO
ZERZ     LR      R10,R3                  (R10)=-HGHT OF CHAR
*                                        (R11)= ST ADDR IN X
*
ZERZA    STH     R9,0(R11)               R9 SET=0 IN ZER ABOVE
         AR      R11,R2                  ST AD=ST AD+NBYX;STAD ON NXT LINE
         AIS     R10,2
         BMS     ZERZA
         AIS     R4,2                    FIND NXT HALFWRD TO ZERO BY INC BY 2 BYTE
ZER1     LR      R11,R4
         CL      R11,PZHWF               WHERE I STOPPED PREVIOUSLY
         BTCS    8,ZERZ                  MUST ZERO THIS LINE
RET      L       R15,RR15
         BR      R15                     RETURN R14 CONTAINS PZHW FOR THIS BRUFFER
**********************************************************
***************END OF FORMAT*******************************
**********************************************************
```

What is claimed is:

1. A method for displaying a digital image comprising the steps of (a) segregating the digital image into a plurality of blocks of pixels, (b) assigning a first identifier associated with the first block of pixels, (c) comparing the second block to the first block and assigning a second identifier with the block if the blocks are different and assigning the first identifier to the second block if the blocks are identical, (d) comparing the third block to the first and second blocks and assigning a third identifier associated with the third block if the third block is different from the first and second blocks and the first and second blocks are different and assigning the associated identifier of either the first or second block to the third block if the third block is identical to either the first or second block, (e) repeating the sequence for said plurality of blocks, (f) preparing a block set for each nonidentical block, correlating the block set with the associated identifier, (g) preparing a block set stream of identifiers associated with each successive block of the image, and (h) displaying the image by scanning the identifiers in the block set stream and loading the associated block sets into a display buffer.

2. In an image display system for displaying a digital image, said image being segregated into a plurality of bit blocks, each nonidentical bit block being associated with an identifier, the system including a first buffer, a second and a bit block stream storage, the bit block stream storage containing the identifier corresponding to each subsequent bit block of the digital image, the method of displaying the digital image comprising the steps of scanning the bit block stream for each identifier associated with each sequential bit block of the digital image, loading a first portion of the bit blocks corresponding to the identifiers in the first buffer, initiating display of the bit blocks in the first buffer, loading the bit blocks corresponding to a second portion of the bit block stream in the second buffer, displaying the bit blocks in the second buffer after completion of the display of the bit blocks in the first buffer, and repeating the sequence for each portion of the bit block stream whereby the entire digital image is displayed.

3. The method of claim 2 wherein each bit block is an M by N pixel matrix, M and N being powers of 2, M being the number of columns and N being the number of rows and wherein the starting address of each bit block is NX wherein X is the identifier associated with each bit block.

4. The method of claim 3 wherein each bit block is an 8×8 pixel matrix and each bit blocks is addressed in multiples of 8.

5. A method for displaying a digital image comprising the steps of (a) segregating the digital image into a plurality of blocks of pixels, (b) assigning unique identifiers associated with nonidentical blocks of piexels, (c) preparing a block set for each nonidentical block, correlating the block set with the associated identifier, (d) preparing a block set stream of identifiers associated with each successive block of the image, and (e) displaying the image by scanning the identifiers in the block set stream and loading the associated block sets into a display buffer.

6. In an image display system for displaying a digital image, said image being segregated into a plurlity of bit blocks, each nonidentical bit block being associated with an identifier, the system including a first buffer, a second buffer and a bit block stream storage, the bit block stream storage containing the identifier corresponding to each subsequent bit block of the digital image, the method of displaying the digital image comprising the steps of scanning the bit block stream for each identifier associated with each sequential bit block the digital image, loading a first portion of the bit blocks corresonding to the identifiers in a buffer, initiating display of the bit blocks in the buffer, and repeating the sequence for each portion of the bit block stream whereby the entire digital image is displayed.

7. In an image display system for displaying a digital image, said image being segregated into a plurality of bit blocks, each nondiientical bit block being associated with an identifier, the system including a first buffer, a second buffer and a bit block stream storage, each bit block being an M by N pixel matrix, M being the number of columns and N being the number of rows and wherein the starting address of each bit block is NX wherein X is the identifier associated with each bit block, the bit block stream storage containing the identifier corresponding to each subsequent bit block of the digital image, the method of displaying the digital image comprising the steps of scanning the bit block stram for each identifier associated with each sequential bit block the digital image, housing a first portion of the bit blocks corresponding to the identifiers in the first buffer, initiating display of the bit blocks in the first buffer, loading the bit blocks corresponding to a second portion of the bit block stream in the second buffer, displaying the bit blocks in the second buffer after completion of the display of the bit blocks in the first buffer, and repeating the seqence for each portion of the bit block stream whereby the entire digital image is displayed.

* * * * *